United States Patent
Simard et al.

(10) Patent No.: US 7,593,574 B2
(45) Date of Patent: Sep. 22, 2009

(54) INK WARPING FOR NORMALIZATION AND BEAUTIFICATION / INK BEAUTIFICATION

(75) Inventors: Patrice Y. Simard, Bellevue, WA (US); Maneesh Agrawala, Seattle, WA (US); David W. Steinkraus, Santa Fe, NM (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 11/173,243

(22) Filed: Jul. 1, 2005

(65) Prior Publication Data

US 2007/0003142 A1    Jan. 4, 2007

(51) Int. Cl.
*G06K 9/18* (2006.01)
(52) U.S. Cl. ............... 382/186; 382/177; 382/178; 382/179; 382/187; 382/188; 382/293
(58) Field of Classification Search ........... 382/177, 382/178, 179, 186, 187, 188, 293
See application file for complete search history.

(56) References Cited

U.S. PATENT DOCUMENTS

| | | | | |
|---|---|---|---|---|
| 4,562,594 | A | * | 12/1985 | Bednar et al. ............ 382/178 |
| 4,727,588 | A | | 2/1988 | Fox et al. |
| 5,577,135 | A | * | 11/1996 | Grajski et al. ............ 382/187 |
| 5,774,586 | A | * | 6/1998 | LeCun ............ 382/215 |
| 5,963,666 | A | * | 10/1999 | Fujisaki et al. ............ 382/187 |
| 6,487,310 | B1 | | 11/2002 | Bishop et al. |
| 2002/0097910 | A1 | | 7/2002 | Guha |
| 2004/0141646 | A1 | | 7/2004 | Mahmoud et al. |

OTHER PUBLICATIONS

Cote, et al. "Automatic Reading of Cursive Scripts Using a Reading Model and Perceptual Concepts" (1998) International Journal on Document Analysis and Recognition, 15 pages.
M. Wienecke, et al. Towards Automatic Video-based Whiteboard Reading. Proceedings of the 7th International Conference on Document Analysis and Recognition, IEEE, 2003. 5 pages.
R.M. Bozinovic and S.N. Srihari. Off-Line Cursive Script Word Recognition. IEEE Transactions on Pattern Analysis and Machine Intelligence, vol. 11 No. 1, pp. 68-83, Jan. 1989.
P.Y. Simard, et al. Best Practices for Convolutional Neural Networks Applied to Visual Document Analysis. In International Conference on Document Analysis and Recognition, pp. 958-962. IEEE Computer Society, Los Alamitos, 2003.

(Continued)

*Primary Examiner*—Bhavesh M Mehta
*Assistant Examiner*—Daniel Zeilberger
(74) *Attorney, Agent, or Firm*—Lee & Hayes, PLLC

(57) ABSTRACT

Systems and methods are disclosed that facilitate normalizing and beautifying digitally generated handwriting, such as can be generated on a tablet PC or via scanning a handwritten document. A classifier can identify extrema in the digital handwriting and label such extrema according to predefined categories (e.g., bottom, baseline, midline, top, other, . . . ). Multi-linear regression, polynomial regression, etc., can be performed to align labeled extrema to respective and corresponding desired points as indicated by the labels. Additionally, displacement techniques can be applied to the regressed handwriting to optimize legibility for reading by a human viewer and/or for character recognition by a handwriting recognition application. The displacement techniques can comprise a "rubber sheet" displacement algorithm in conjunction with a "rubber rod" displacement algorithm, which can collectively preserve spatial features of the handwriting during warping thereof.

20 Claims, 12 Drawing Sheets

OTHER PUBLICATIONS

G. Nicchiotti and C. Scagliola. Generalised Projections: a Tool for Cursive Handwriting Normalisation. In Proc. of 5th International Conference on Document Analysis and Recognition, pp. 729-732. IEEE Computer Society, Los Alamitos, 2003.

R. Szeliski. Fast Surface Interpolation Using Hierarchical Basis Functions. In IEEE Trans. on Pattern Analysis and Machine Intelligence, vol. 12, pp. 513-528, 1990.

Y. Bengio, et al. Lerec: A nn/hmm Hybrid for On-line Handwriting Recognition. Neural Computation, 7(6), pp. 1289-1303, 1995.

A. Vinciarelli and J. Luettin. A New Normalization Technique for Cursive Handwritten Words. Pattern Recognition Letters, vol. 22 No. 9, pp. 1043-1050, 2001.

International Search Report and Written Opinion, dated Mar. 28, 2008, PCT application No. PCT/US06/25884, 9 pages.

* cited by examiner

Whose woods these are I think I know
His house is in the village though

Whose woods these are I think I know
His house is in the village though

Whose woods these are I think I know
His house is in the village though

Whose woods these are I think I know
His house is in the village though 502
504
506
508

INK WARPING FOR NORMALIZATION AND BEAUTIFICATION / INK BEAUTIFICATION

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

As computing devices have continued to develop and their use have become more widespread, peripherals associated with such devices have also become commonplace. For instance, typical computing devices include a plurality of ports (e.g., wired or wireless) into which peripherals can be attached and utilized in connection with the aforementioned computing devices. More particularly, attachable peripherals can include printers, keyboards, portable music/video players and recorders, cameras, video cards, speaker systems, personal digital assistants (PDAs), portable telephones, smart phones, or any other suitable computer peripheral. These devices can be physically coupled to a computing device by way of ports (e.g., USB ports, printer ports, . . . ), or can be communicatively coupled over a wireless link. This interaction of peripherals with computing devices has rendered such computing devices even more valuable in terms of user efficiency. Additionally, in the case of memory (resident or peripheral), finite storage limitations must be considered when allocating memory resource.

Moreover, recent advances in computing technology have made possible tablet PC architecture that facilitates generating digitally handwritten images. However, interpretation of such handwriting by a character recognition component and/ or a human reader can be impeded by the high variability of handwriting and by segmentation errors that occur during a recognition procedure. Accordingly, there is an unmet need for systems and/or methods that overcome the above-mentioned deficiencies.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system that automatically adds labels (e.g., classifies) to features in digitally generated handwritten ink, such as can be generated on a tablet PC or by scanning a handwritten document. In the case of handwriting from a tablet PC, initial identification of extrema can be based at least in part on, for example, time trajectories associated with the generation of the handwriting. More specifically a classifier can label extrema (e.g., maxima and minima) in the digital ink according to whether such extrema are intended to be aligned with a bottom line, a base line, a midline, a top line, or some other alignment marker. Additionally, labels can comprise letters (e.g., via a separate classifier), and classifications can be combined to improve overall ink classification. Labeled extrema can be employed to identify writing versus other forms of digitally generated imagery, to normalize handwritten ink strokes as a pre-processing act prior to a handwriting recognition procedure, to build a handwriting recognition application, to improve legibility for human interpretation, etc.

According to a related aspect, classified extrema can be employed to warp handwriting to corresponding target positions in order to improve legibility and/or recognition. For example, a rubber sheet displacement protocol can be performed, followed by a rubber rod displacement protocol, in order to improve legibility while preserving ink stroke features that are important to readability (e.g., relative placement, angle, curvature, . . . ) and mitigating introduction of undesirable features (e.g., kinks, curvature inversion, undesired intersection of ink strokes, . . . ).

According to another aspect, a system can comprise a classifier component that receives as input data related to a digitally handwritten document and labels extrema in digitally handwritten words, and a regression component evaluates offsets between extrema in the handwritten words to determine new positions for respective extrema and performs a multi-linear regression that aligns extrema points to the new positions indicated by the classifier labels to increase legibility. Additionally, the system can comprise an interpolation component that interpolates labeled handwriting to a two-dimensional grid and performs a rubber sheet displacement technique on the handwriting, and a displacement component that performs a one-dimensional rubber rob displacement technique warp the digital handwriting and improve legibility for a handwriting recognition application and/or a human viewer.

In still another aspect, a method of improving legibility and mitigating segmentation errors can comprise classifying minima and maxima in digital ink representations of handwritten words, determining offsets between original positions of maxima and minima and desired positions associated with maxima and minima classifications, and warping the handwritten words to improve legibility. Warping the handwritten words can comprise a rubber sheet displacement protocol followed by a rubber rod displacement protocol.

In yet another aspect, a digital ink normalization system can comprise means for identifying extrema in the handwriting, means for classifying identified extrema, means for warping the classified extrema to desired positions, and means for retaining curvatures, aspect ratios, and angles associated with individual ink strokes in the handwriting. In this manner, ink features related to preserving legibility can be retained and improved, while introduction of features that impede legibility can be avoided.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents.

Other advantages and novel features of the invention will become apparent from the following detailed description of the invention when considered in conjunction with the drawings.

BRIEF DESCRIPTION OF THE DRAWINGS

FIG. 5 illustrates a series of two-line paragraph handwriting samples, such as can be written on a tablet PC, at various stages in a beautification/normalization procedure.

FIG. 8 is an illustration of a methodology for normalizing and beautifying digitally generated handwriting, such as on a Tablet PC, a scanned handwriting document, and the like.

DETAILED DESCRIPTION

Figure 1:
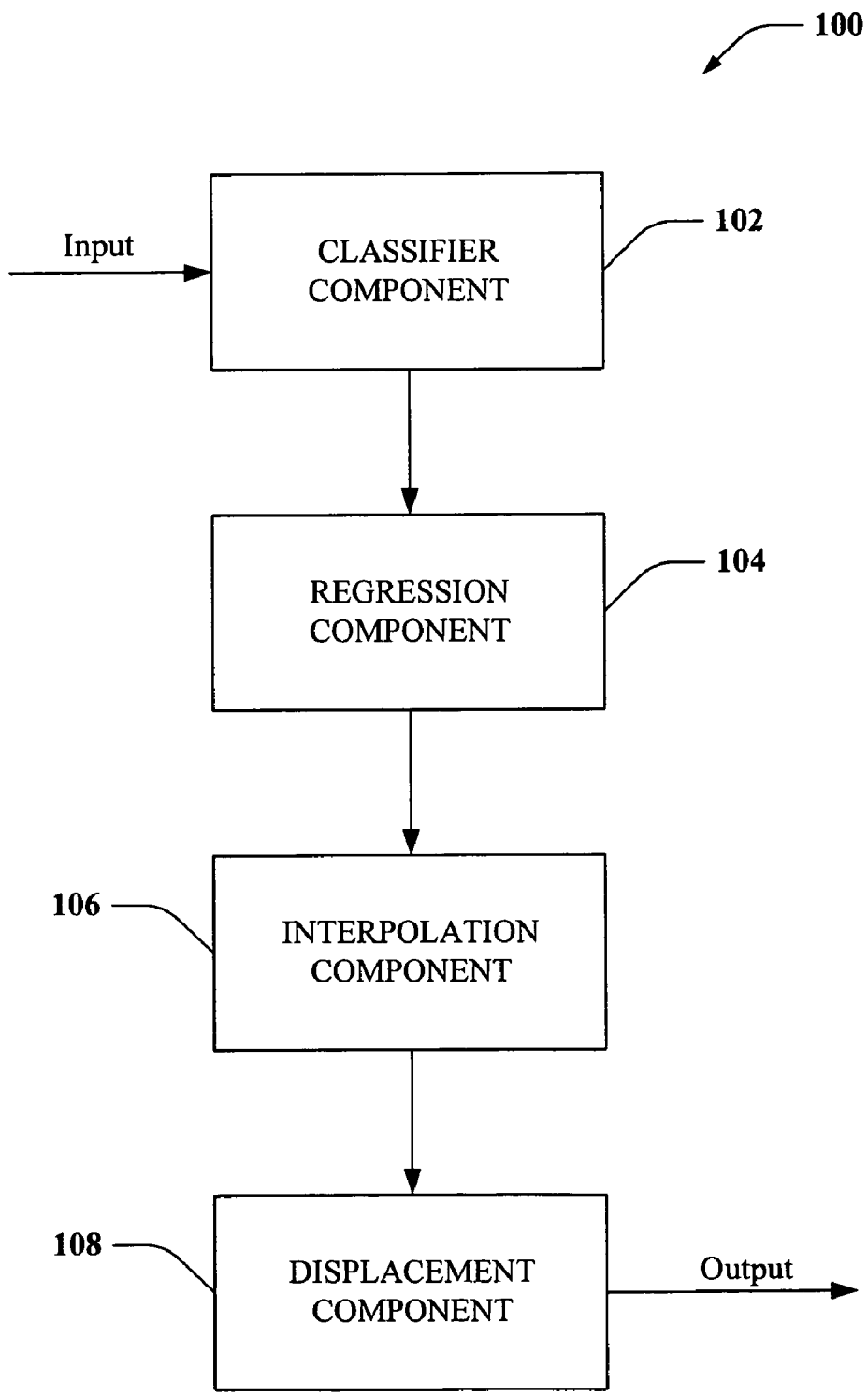
FIG. 1 illustrates a system that facilitates ink warping of digitally generated handwriting, such as can be created on a tablet PC or the like, while mitigating segmentation errors in accordance with various aspects.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

According to various aspects described herein, systems and methods are described that facilitate minimizing segmentation errors and difficulties related to handwriting variations in a manner not achievable using conventional methods and/or systems of handwriting recognition. For example, an extrema classifier can be generated and utilized to label maxima and minima in digital ink handwriting to normalize the ink and handwriting variations without requiring letter segmentation. Conventional systems often include a preprocessing step to remove slant and slope, such as a histogram projection, entropy heuristics, (e.g., during off-line recognition), etc. Other systems track baselines and/or midlines using cubic splines and the like. During online recognition, baseline and/or midline tracking can also be useful for computing offline features, and parallel quadratic curves can be employed to track lines in order to extract angle maps, etc. However, conventional systems and/or methods of handwriting recognition do not identify extrema in ink handwriting as belonging or not belonging to lines (e.g., baseline, midline, etc.), let alone with a high degree of accuracy. Thus, in accordance with various aspects presented below, handwriting extrema can be classified accurately, without letter segmentation, and digital handwriting can be normalized and/or beautified without requiring segmentation and/or letter recognition.

Referring now to FIG. 1, there is illustrated a system 100 that facilitates ink warping of digitally generated handwriting, such as can be created on a tablet PC or the like, while mitigating segmentation errors in accordance with various aspects. The system 100 comprises a classifier component 102 that receives input such as digitally generated ink writing, and labels local minima (e.g., bottom, baseline, other) and local maxima (e.g., midline, top, other) of the ink letters. Information generated by the classifier component 102 can be employed to normalize the ink, for example, by applying a "rubber sheet" warping technique in conjunction with a "rubber rod" warping technique. Such warping techniques can be performed utilizing conjugate gradient algorithms, as are known in the art. In this manner, ink normalization can be performed in conjunction with letter recognition to mitigate segmentation errors that often arise due to conventional techniques.

The classifier component 102 is operatively coupled to a regression component 104 that can receive information related to labeled digital ink (e.g., labeled maxima and/or minima in digital handwriting data) and can perform a multi-line regression technique (e.g., a multi-linear regression, a polynomial regression or other non-linear regression, ...) to evaluate relative offsets between a bottom line (e.g., a decender line), a base line, a midline, a top line, and/or any other suitable marker line that can be employed to delineate points within a handwriting environment. Relative offsets can be utilized to delineate a new desired position for each maximum and minimum. The new desired positions for maximum and minimum are selective constraints at a given location. However, the ink can be deformed continuously and the constraints can be interpolated to location(s) between the maximum and minimum of ink. An interpolation component 106 can receive such information from the regression component 104 and can interpolate offsets and/or point displacements to a two-dimensional (2D) grid by employing various interpolation techniques and/or constraints, which facilitates providing displacement values that are unconstrained. For example, the interpolation component 106 can employ "rubber sheet" (described below) or "thick-plate" warping constraints. Kinks and/or curvature in digital ink resulting from interpolation can be mitigated utilizing a displacement component 108 that receives interpolated handwriting data from the interpolation component 106 and enforces curvature and/or compression constraints between original and interpolated ink. For instance, the displacement component can employ a "rubber rod" technique, described below, to enforce such constraints.

The classifier component 102 can determine local vertical minima and maxima from, for example, time trajectory information obtained from a pen-enabled or stylus-enabled capture device, such as a tablet PC, laptop, or the like. Each extremum can be classified to a label corresponding to its target position in order to facilitate optimization of handwriting alignment. For example, minima can be grouped into three categories, such as bottom, baseline, and other, where "other" comprises any minima that do not fall into the bottom or baseline categories and need not be subject to an alignment constraint. Similarly, maxima can be categorized into midline, top, and "other" groups, where "other" group can likewise be exempt from alignment constraints and can comprise ink maxima that do not fall within the midline or top groups. It will be appreciated that any number of minima and/or maxima categories can be defined in accordance aspects presented herein to provide increased granularity with regard to handwriting manipulation, and that the subject minima and maxima categories are not limited to three groups each.

Automatically labeling extrema involves accounting for widely varied characters and/or handwriting styles. Initial labeling can be performed by the classifier component 102 by, for example, projecting the digital ink horizontally and analyzing a histogram to identify a base line and a midline, in order to pre-label data prior to classification. In order to increase accuracy of the system 100, the classifier component 102 can comprise a convolution classifier similar to a classifier employed for character classification, described in greater detail with regard to FIG. 2.

Still referring to FIG. 1, given a set of points belonging to M labeled lines, (e.g., a baseline, ... ) as categorized by the classifier component 102, offsets for each line can be assessed by the regression component 104 to facilitate computing an optimal displacement that will align each point to its respective target line. In the following, it can be assumed without loss of generality that the baseline, midline, etc., are straight and parallel, although it is possible to assume a more complex model and perform the more complex corresponding regression (e.g. quadratic, polynomial, ... ). According to this example, lines (e.g., baseline, midline, etc.) are constrained to be parallel, and a linear regression can be performed by the regression component 104 such that, if each point (x,y) belonging to the line j follows the equation:

$$y = ax + b_j \quad (1)$$

then finding a and $b_j$ given M collections of $N_j$ points $(x_i^j, y_i^j)$ can be performed by minimizing the following expression:

$$E(a, b_0, \ldots, b_{M-1}) = \sum_{j=0}^{M-1} \sum_{i=0}^{N_j-1} \frac{1}{2}(y_i^j - (ax_i^j + b_j))^2 \quad (2)$$

Setting the derivatives of $E(a, b_0, \ldots, b_{M-1})$ with respect to $a, b_0, \ldots, b_{M-1} = 0$ yields the following linear system of M+1 equations and M+1 variables:

$$T_{xx}a + \sum_{j=0}^{j=M-1} T_x^j b_j - T_{xy} = 0 \quad (3)$$

$$T_x^0 a + N_0 b_0 - T_y^0 = 0 \quad (4)$$

and so on through $$T_x^{M-1} a + N_{M-1} b_{M-1} - T_y^{M-1} = 0 \quad (5)$$

Where $\quad (6)$ $$T_{xx} = \sum_{j=0}^{j=M-1} \sum_{i=0}^{N_j-1} x_i^j x_i^j,$$

$$T_x = \sum_{j=0}^{j=M-1} \sum_{i=0}^{N_j-1} x_i^j,$$

$$T_{xy} = \sum_{j=0}^{j=M-1} \sum_{i=0}^{N_j-1} x_i^j y_i^j,$$

$$T_x^j = \sum_{i=0}^{N_j-1} x_i^j,$$

and $$T_y^j = \sum_{i=0}^{N_j-1} y_i^j,$$

which yields:

$$a = \frac{T_{xy} - \sum_{j=0}^{j=M-1} \frac{1}{N_j} T_x^j T_y^j}{T_{xx} - \sum_{j=0}^{j=M-1} \frac{1}{N_j} T_x^j T_y^j},$$

and $$b_j = \frac{1}{N_j}(T_y^j - T_x^j a) \quad (7)$$

The number of M lines can vary (e.g., in cases where one or more writing samples do not exhibit ascenders and/or descenders, ... ). Additionally, the regression component 104 can perform a linear regression technique concurrently on multiple lines of digital handwriting (e.g., a paragraph, a page, ... ), wherein the text has multiple baselines, midlines, etc. Moreover, in cases where none of the M lines of text has more than one point, an assumption can be made that $\alpha = 0$. Exemplary illustrations of line regressions are provided to facilitate understanding on the manner in which the regression component can operate below with regard to FIGS. 3 and 4.

When warping digital ink handwriting, isometric transformations of the handwritten text, such as translation and/or rotation, can be manipulated to restore alignment between words. However, such transformations typically do not restore alignment between letters within a word. In order to restore alignment within a handwritten word, letters can be moved relative to each other, which in turn can result in a direct alteration of the appearance of the digital ink. Thus, in order to maintain appealing visual appearance, three constraints are utilized in conjunction with system 100: an alignment constraint, a spatial feature preservation constraint, and a local ink preservation constraint.

The alignment constraint ensures that any displacement should move an extremum to a line to which it belongs, and, as such, affects relatively few points (e.g., at extrema locations) and constrains only the vertical component of displacement. The spatial feature preservation constraint ensures that intersections and distances between pieces of ink should be preserved. For example, a "u" should not be closed to resemble and "o" or an "a." Similarly, all strokes of a multi-stroke character (e.g., a "t," and accented "e," . . . ) should move together to prevent occurrences of orphan strokes. Thus, handwritten digital ink can be subjected to 2D image constraints that govern pieces of ink drawn at different times and which need not be connected.

The local ink feature preservation constraints can be employed to govern curvature, angles, aspect ratios, etc., of letters and/or words in the handwritten text. The displacement component 108 can employ a curvature preservation constraint to preserve such aspects of the handwriting, and can ensure that curvatures are not inverted and/or that kinks are not introduced to letters during warping. Preservation of aspect ratios is a form of compressibility constraint that ensures that a "d" is not transformed into an "a" by vertical compression of the upper part of the "d." Finally, an angle preservation constraint can ensure that slants and angles of separated strokes are preserved, such as "t" crossings, accent marks, etc. The angle constraint can be locally enforced to affect the global angle and/or slant of an accent, letter, etc. In general, the local ink preservation constraints can facilitate providing a buffer during warping between original ink handwriting and transformed ink handwriting.

As stated above, the interpolation component 106 can employ a rubber sheet optimization technique to interpolate digital ink points to a 2D grid for warping. When employing such technique, the alignment constraint and the spatial feature preservation constraint can be concurrently optimized. Displacement can be described as $(u_{i,j}, v_{i,j})$, which denotes a u component and a v component at each point (i,j), such that the v component is constrained to fixed values at the ink extrema locations in J:

$$\forall (i,j) \in J, v_{i,j} = t_{i,j} \qquad (8)$$

which can be rewritten as a soft constraint, such that:

$$E_t(v) = \frac{1}{2} \sum_{(i,j) \in J} (v_{i,j} - t_{i,j})^2 \qquad (9)$$

The horizontal component u is can be unconstrained, such that $E_t(u)=0$. The spatial feature preservation constraint can require a smooth displacement when enforced by minimizing the first and second derivatives of the displacement field. For instance, minimization of the first derivative can be expressed as:

$$E_m(u, v) = \frac{1}{2} \sum_{(i,j)} \left[ \begin{array}{c} (u_{i+1,j} - u_{i,j})^2 + (u_{i,j+1} - u_{i,j})^2 + \\ (v_{i+1,j} - v_{i,j})^2 + (v_{i,j+1} - u_{i,j})^2 \end{array} \right] \qquad (10)$$

Minimization of the second derivative can be expressed as:

$$E_p(u) = \frac{1}{2} \sum_{(i,j)} \left[ \begin{array}{c} (u_{i+1,j} - 2u_{i,j} + u_{i,j+1})^2 + \\ 2(u_{i+1,j+1} - u_{i,j+1} - u_{i+1,j} + u_{i,j})^2 + \\ (u_{i,j+1} - 2u_{i,j} + u_{i,j-1})^2 \end{array} \right] \qquad (11)$$

The second derivative constraint can be applied to both the u component and the v component of the displacement field, such that $E_p(u,v)=E_p(u)+E_p(v)$. A membrane model can minimize $E_t(u,v)$ and $E_m(u,v)$, while a thin plate model can minimize $E_t(u,v)$ and $E_p(u,v)$. Additionally, it is to be appreciated that the constraints $E_t(u)$, $E_m(u)$, and $E_p(u)$, and the constraints $E_t(v)$, $E_m(v)$, and $E_p(v)$ are independent constraints. Thus, when u=0, $E_t(u)$, $E_m(u)$, and $E_p(u)$ are minimized, and the next minimization can be performed on the expression:

$$E(v) = \alpha_t E_t(v) + \alpha_m E_m(v) + \alpha_p E_p(v) \qquad (12)$$

where $\alpha_t$, $\alpha_m$, and $\alpha_p$ are weighting factors on the errors being minimized. If hard constraints are employed, then E(v)=0, and $\alpha_t = \infty$. Because equation (12) is linear with regard to v, it can be solved using a conjugate gradient descent with a multi-resolution approach. The results of employing such protocols are illustrated with regard to FIG. 3.

When enforcing the third constraint(s), regarding angle, aspect ratio, and curvature, local constraints can be applied between a new ink trajectory and the original ink. For example, let x(t) and y(t) be the coordinates of points along the ink trajectory of handwriting that has undergone a rubber sheet interpolation. Additionally, let $\chi_t$ and $\psi_t$ be target points through which the ink is desired to pass for subsets of points on J. The target constraint can then be written as:

$$E_t(x, y) = \frac{1}{2} \sum_{(T) \in J} (x_t - \chi_t)^2 (y_t - \psi_t)^2 \qquad (13)$$

As stated above, rubber sheet interpolation can cause kinks and/or curvature alterations in handwritten digital ink. Accordingly, a constraint to prevent such undesired deformation of the handwriting during warping can be selected and/or introduced, which ties the curvature of the displaced curve x(t),y(t) to the curvature of the original curve X(t), Y(t). The constraint can be optimized using a gradient descent technique, and can be designed so that it does not generate arbitrarily large gradients, which can cause unnecessarily large eigenvalues in the parameter space of optimization. For example, a conventional curvature definition for a curvature x(t),y(t) can be expressed as:

$$\kappa(t) = \frac{x'(t)y''(t) - y'(t)x''(t)}{(x'(t)^2 + y'(t)^2)^{3/2}} \qquad (14)$$

The above curvature definition can vary from 0, for a straight line, to arbitrarily large values for a sharp reversal in direction. Moreover, such definition is unstable when optimized using a gradient descent technique. Therefore, the following constraint is designed and optimized in accordance with various aspects described herein to facilitate definition and optimization of handwriting curvature.:

$$E_c(x, y) = \frac{1}{2}\sum_t (\cos(\theta(t)) - \cos(\Theta(t)))^2 + (\sin(\theta(t)) - \sin(\Theta(t)))^2 \quad (15)$$

where θ(t) is defined as the angle between three consecutive points on the curve x(t),y(t), and Θ(t) is defined as the angle between three consecutive points on the curve X(t),Y(t). Additionally, duplicate consecutive points can be forbidden in order to facilitate optimization of the above definition. The derivative of $E_c(x,y)$ with respect to x(t) and y(t) can be bounded everywhere in order to facilitate optimization.

In order to mitigate undesirably large deviations in distance between consecutive points, an additional constraint can be enforced along the ink trajectory, such that:

$$E_l(x, y) = \frac{1}{2}\sum_t (l(t) - L(t))^2 \quad (16)$$

where l(t) and L(t) are defined as the distances between two consecutive points on the curves x(t),y(t) and X(t),Y(t), respectively. When both constraints (e.g., equations 15 and 16) are fully satisfied, ink portions and/or segments can still be permitted to rotate.

An "angle" constraint can be enforced on absolute angles of curves in the handwriting in a manner that is relatively relaxed when compared to the manners in which the other constraints are enforced. The angle constraint governs otherwise uncontrolled pieces of ink, such as t-crossings, accent marks, etc., as follows:

$$E_a(x, y) = \frac{1}{2}\sum_t (\cos(\overline{\theta}(t)) - \cos(\overline{\Theta}(t)))^2 + (\sin(\overline{\theta}(t)) - \sin(\overline{\Theta}(t)))^2 \quad (17)$$

where $\overline{\theta}(t)$ is defined as the angle between two consecutive points on the curve x(t),y(t), and $\overline{\Theta}(t)$ is defined as the angle between two consecutive points on the curve X(t),Y(t). Finally, an optimization can be performed such that:

$$E_R(x,y) = \beta_r E_r(x,y) + \beta_c E_c(x,y) + \beta_l E_l(x,y) + \beta_a E_a(x,y) \quad (18)$$

In contrast to rubber sheet optimization, $E_R$ is highly nonlinear with respect to x and y and can exhibit multiple local minima. The rubber rod technique displaces extrema of the ink along a pre-shaped "rubber rod" (e.g., an adjustable linear dimension), in order to warp the extrema to their desired positions along corresponding lines. As seen with regard to FIGS. 3 and 4 below, a combination of a rubber sheet and robber rod displacement techniques can be performed by the interpolation component 106 and displacement component 108 to facilitate achieving desired normalization and beautification of handwritten digital ink while each technique mitigates undesirable side effects of the other.

Figure 2:
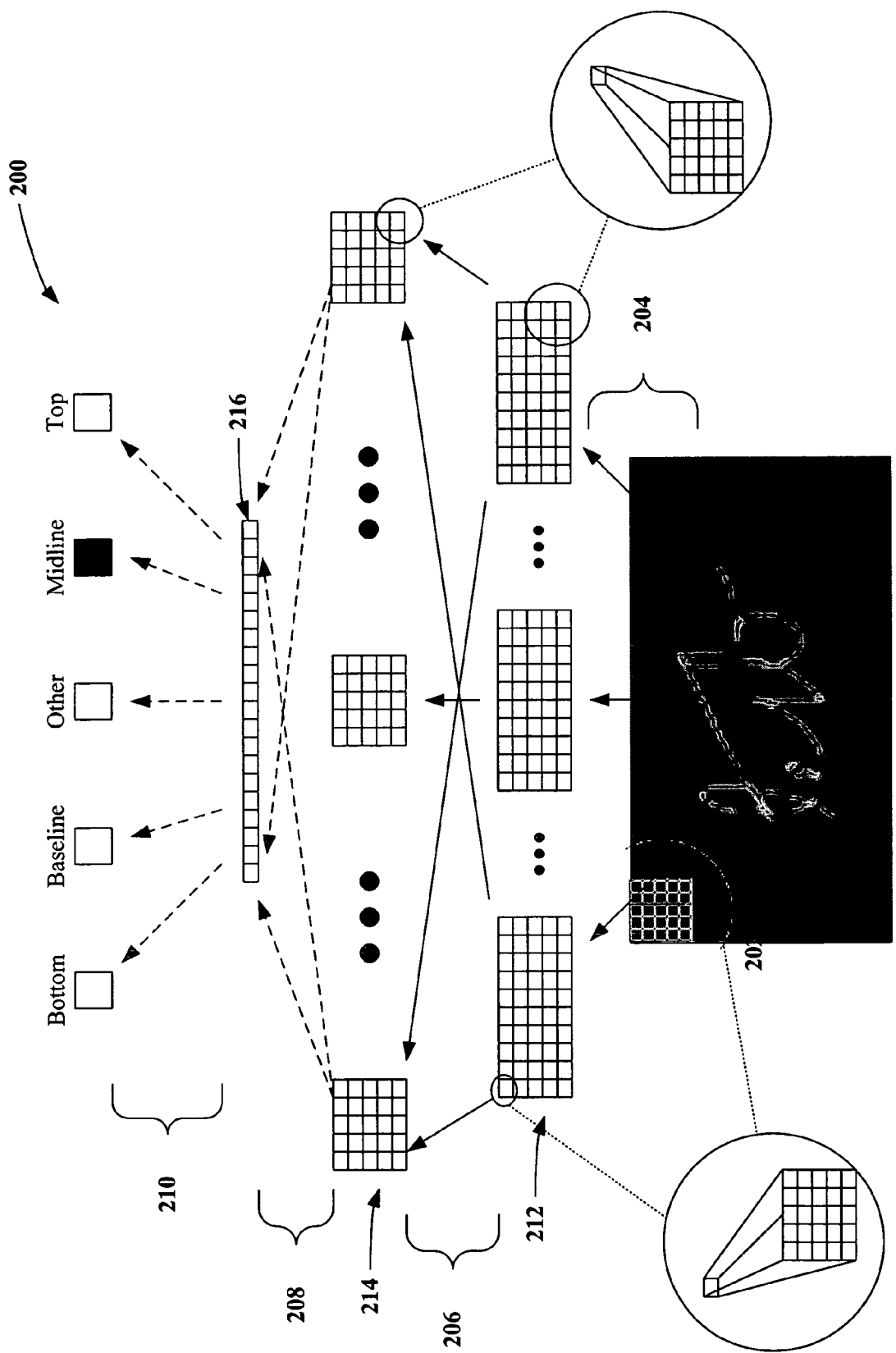
FIG. 2 illustrates a convolution classifier that classifies extrema in digital ink handwriting in accordance with various aspects.

Referring now to FIG. 2, there is illustrated a convolution classifier 200 that classifies extrema in digital ink handwriting in accordance with various aspects. The classifier 200 can receive an input of a pixel image 202 comprising digital handwriting, such as can be generated in conjunction with a tablet PC or the like. For example, such an image 202 can be an 45×85 pixel image, centered on an extremum to be classified. In this case, the extremum to be classified is a midline point at the peak of the letter "s" in the word "test, in the image 202. The crosshairs presented in the image 202 are not part of the input, but are presented in the image 202 to more clearly point out the extremum being classified. Two layers of weights 204 and 206 are illustrated as 5×5 subsampled convolutional kernels, as depicted with solid arrows. A second pair of weight layers 208 and 210 are fully connected layers, and are illustrated with hashed arrows. The first convolutional layer 212 has fifty features according to this example, while the second convolutional layer 214 comprises five features. The third layer 216 comprises one hundred units, and is fully connected. The classifier 200 can output five units (e.g., one for each label for bottom, baseline, other, midline, and top), and can be trained with, for instance, a cross-entropy technique, as will be appreciated by one skilled in the art.

Conventional convolutional classifiers, when utilized alone, can be error prone, and labelers can disagree on ambiguous extrema. For instance, according to an example, a database of approximately 10,000 words handwritten in digital ink can be labeled by a convolutional classifier. Words in the database can have an average length of 5 letters and an average of 4 extrema per word. The bottom of the letter "f" represents an example of an ambiguity-prone extrema in that it can be a baseline extremum, a bottom extremum (e.g., a descender, . . . ), in between the two extrema, etc., depending on the handwriting. Similarly, a script "e" can be arguably baseline or "other." Table 1 below illustrates error data based on a classifier trained on approximately 10,000 words and tested on a different subset of over 500 words.

TABLE 1

MinMax Error Rates For Convolution Neural Network and Histogram Projection

| Labels | Examples | Neural Network | Neural Network (harm.) |
|---|---|---|---|
| Other | 3466 | 19% | 19% |
| Ascender | 843 | 29% | 14% |
| Midline | 2276 | 17% | 4% |
| Baseline | 3198 | 7% | 0% |
| Descender | 175 | 15% | 10% |
| Total: | 9958 | 16% | 9% |

Minima and maxima error rates for a convolutional neural network classifier and histogram projection are presented in Table 1. For each line, the error percentage represents a number of errors for the given category. The "NN (harm.)" column represents most harmful errors. While misclassification of an extrema as "other" is less harmful than other types of errors because the "other" classifications need not be affected by the normalization/beautification algorithm, misclassification of an "other" extrema as something else can be detrimental. However, despite the occurrence of ambiguous extrema, the subject systems and methods can classify extrema with accuracy above 84%.

Figure 3:
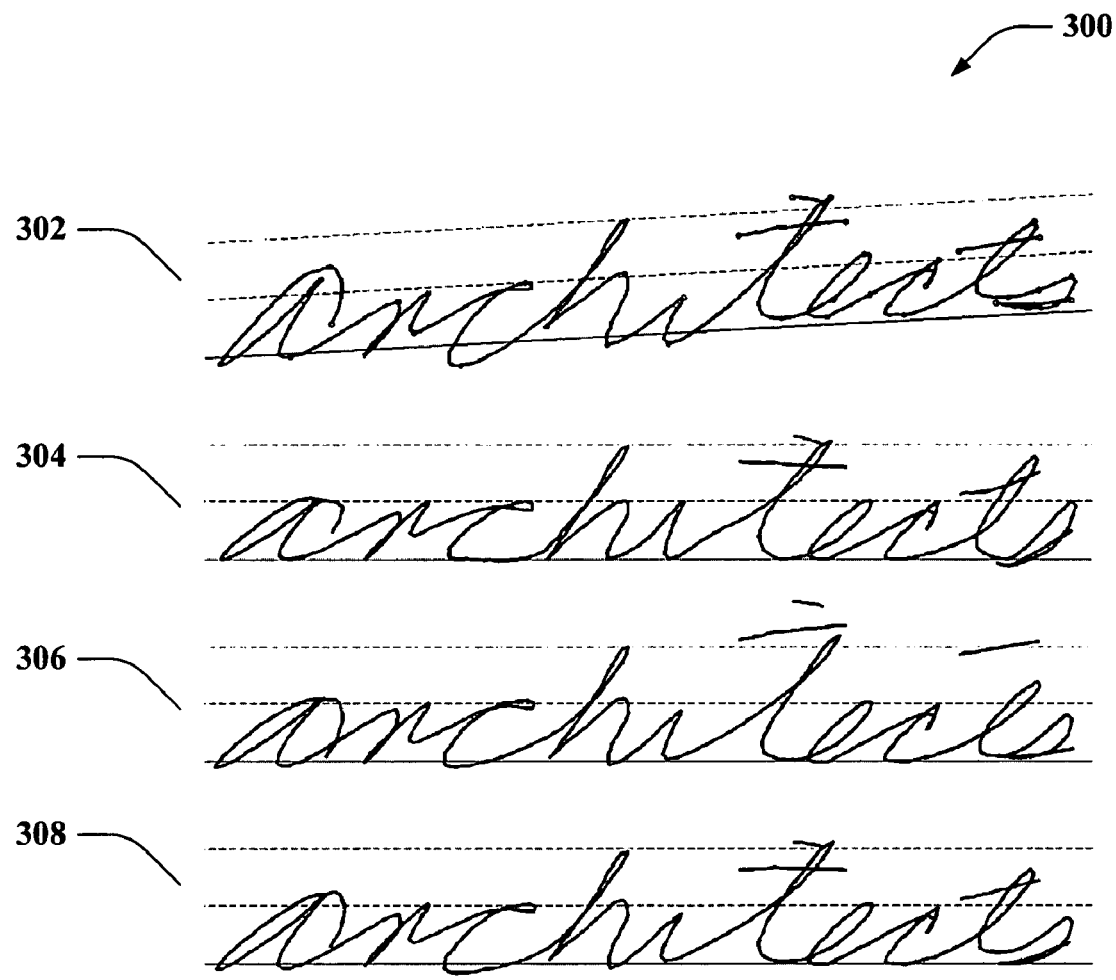
FIG. 3 is an illustration of a digital handwriting sample after a multi-resolution technique employing a conjugate gradient descent protocol when normalizing digital ink handwriting, in accordance with various aspects.

FIG. 3 is an illustration of a digital handwriting sample 300 after a multi-resolution technique employing a conjugate gradient descent protocol to solve equation (12) when normalizing digital ink handwriting, in accordance with various aspects. Threshold parameters for performing the normalization can be adjusted as needed to compensate for a variety of handwriting styles and/or variations. The sample 300 comprises a first line 302 depicting original handwriting such as can be input into the system 100 described above. A second line 304 illustrates the handwriting sample after a rubber sheet displacement/interpolation technique has been performed thereon, where $\alpha_r=\infty$, $\alpha_m=0.01$, and $\alpha_p=1$. As illustrated, the 2D rubber sheet displacement is effective for satisfying the target constraints (e.g., the alignment constraint and the spatial feature preservation constraint) and preserves special relationships between various portions of the handwritten ink, such as the crossing on the "t"s in "architect." However, it will be noted that the first "c" has been flattened, the "s" has been kinked, and the slants of the t-crossings have been detrimentally affected.

The third line 306 of sample 300 illustrates a handwriting input (e.g., such as line 302) that has been subjected to a 1-dimensional (1D) rubber rod displacement technique, as described above with regard to FIG. 1. In this particular example, $\beta_t=0.001$, $\beta_f=0.01$, $\beta_c=1$, and $\beta_a=0.02$. The rubber rod technique does not preserve the 2D spatial relationships between ink portions in the handwritten line 306. Foe instance, the first "a" crosses itself, which occurrence is not present in the original handwritten line 302. Additionally, the t-crossings have been abandoned and no longer cross their respective "t"s. Thus, it can be seen that the 2D rubber sheet interpolation technique and the 1D rubber rod displacement technique have individual drawbacks. However, respective drawbacks can be mitigated by employing the two techniques concurrently (e.g., using the same parameters described above) to enforce all desired constraints on a single digital ink handwriting input, as illustrated by the fourth line of handwriting 308.

Figure 4:
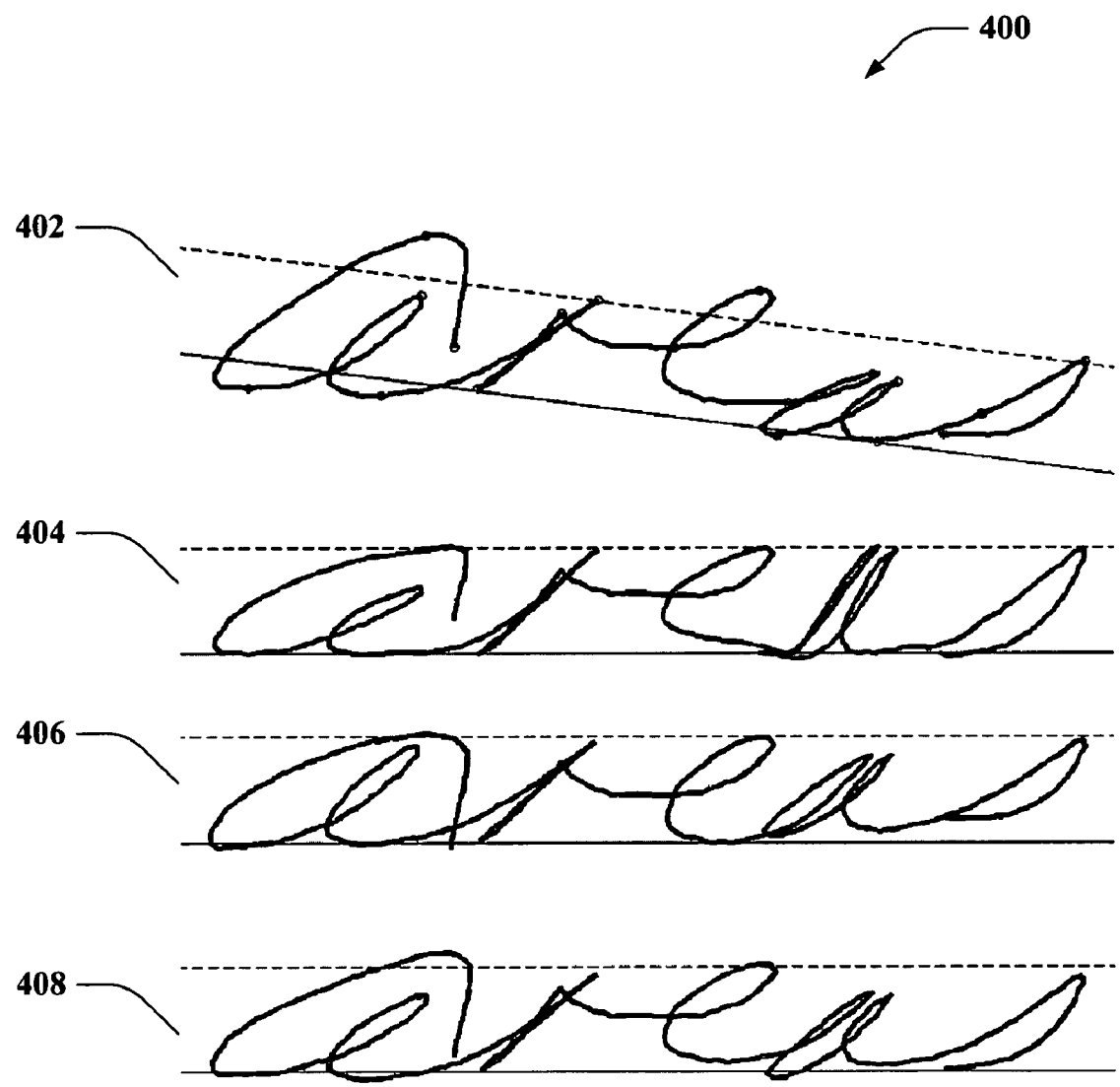
FIG. 4 is an illustration of a series of handwriting samples comprising an original handwritten sample and a plurality of versions of the sample at various stages of normalization.

FIG. 4 is an illustration of a series of handwriting samples 400 comprising an original handwritten sample and a plurality of versions of the sample at various stages of normalization. The original handwriting sample 402 is comprises the word "areas," with a plurality ink portions that require normalization and depicts regression lines (e.g., a solid baseline and a hashed midline). Sample 404 is an example of the handwriting sample after a rubber sheet interpolation technique only, wherein $\alpha_t=\infty$, $\alpha_m=0.01$, and $\alpha_p=1$. It will be noted that two points on and/or near the second "a" are undesirably compressed on the baseline, creating a detrimentally unnatural effect. Similarly, sample 406 is an example of handwriting that has undergone only a rubber rod displacement technique, wherein $\beta_t=0.001$, $\beta_f=0.01$, $\beta_c=1$, and $\beta_a=0.02$. As will be noted, the first "a" has been caused to cross itself, while the second "a" exhibits an exaggerated first loop, and the "s" has not been displaced to the baseline as desired. Such deformations are not only aesthetically undesirable, but can impede a character recognition system from properly interpreting the handwritten word.

In order to mitigate the undesirable effects of the rubber sheet interpolation as shown by sample 404, rigidity can be enforced by subsequently applying the rubber rod displacement technique to the sample. For example, rubber sheet deformation can be computed and a corresponding displacement can be applied to compute a new X(t),Y(t) target trajectory. The target trajectory can be the target of $E_t(x,y)$ of the rubber rod constraints (where J contains every point), and $E_R(x,y)$ can then be optimized. Sample 408 depicts an example of digital handwriting that has been subjected to a rubber sheet interpolation followed by a rubber rod displacement technique.

FIG. 5 illustrates a series of two-line paragraph handwriting samples 500, such as can be written on a tablet PC, at various stages in a beautification/normalization procedure. The first sample 502 represents original ink, before any manipulation, for comparative purposes. The second sample 504 depicts the original ink after warping of the baseline and midline. The minima and maxima have been labeled with the classifier described with regard to FIG. 2. The minima and maxima labeled as 'other', 'bottom', and 'top' do not constrain the warping. The dot on the 'i' of "His" has been mislabeled by the classifier as midline, causing an undesirable warp. Sample 506 illustrates the effects of affine transform on the ink (e.g., no warping), with manual labeling. The effects of warping in conjunction with manual labeling are seen in sample 508, which illustrates the results that can be obtained using the classifier described herein. Samples 506 and 508 are provided to illustrate the differences between affine transformation, which leaves the ink unchanged except for rotational and translational displacement, and warping.

Figure 6:
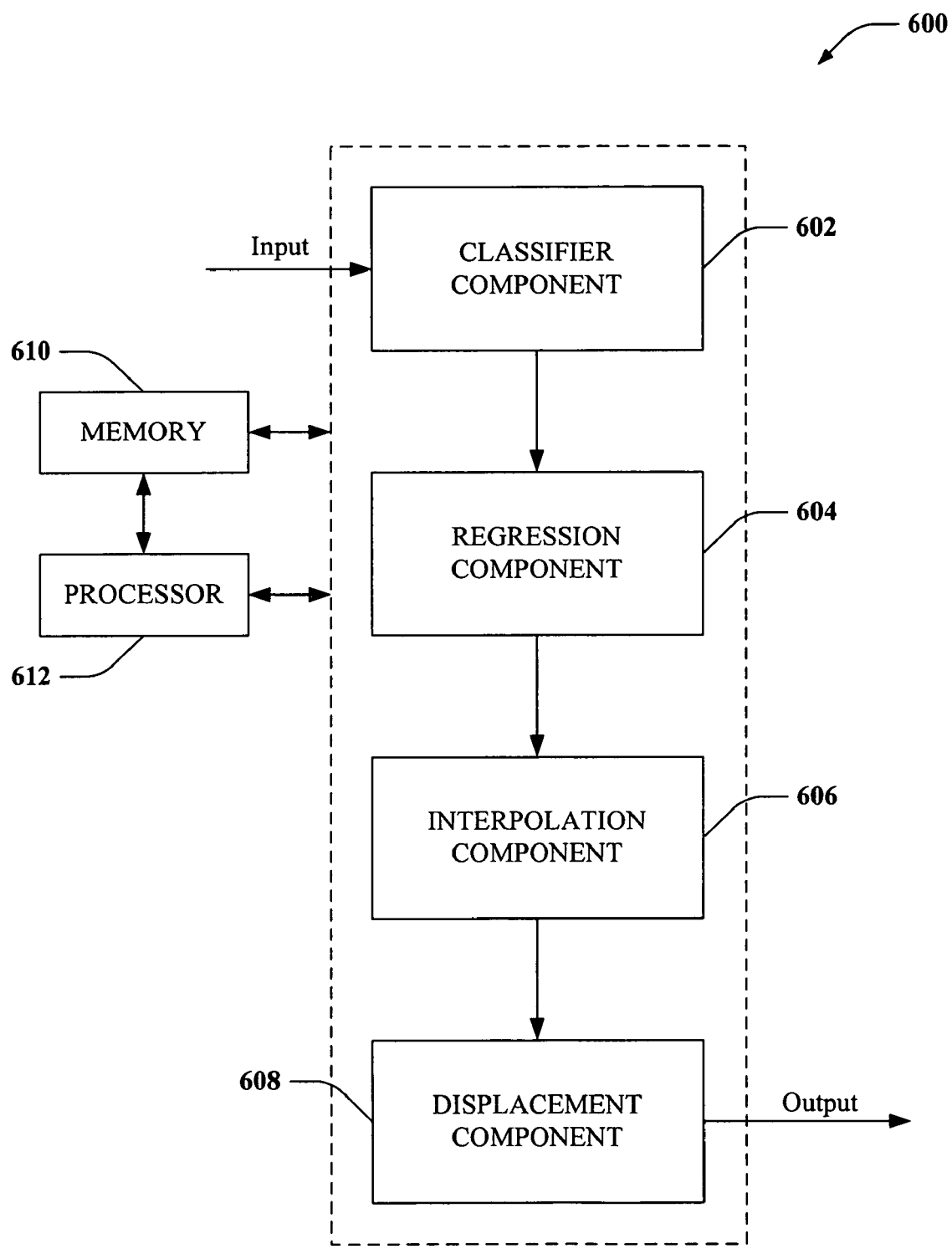
FIG. 6 is an illustration of a system that facilitates classifying extrema in digitally inked handwriting to permit warping of handwritten words to minimize handwriting variability without segmentation.

FIG. 6 is an illustration of a system 600 that facilitates classifying extrema in digitally inked handwriting to permit warping of handwritten words to minimize handwriting variability without segmentation. The system 600 comprises a classifier component 602 that can receive input such as digitally generated ink writing, which can be generated on a tablet PC or the like, and labels local minima (e.g., bottom, baseline, other) and local maxima (e.g., midline, top, other) of the ink letters. Information generated by the classifier component 602 can be employed to normalize the ink, as detailed above for example, by applying a "rubber sheet" warping technique in conjunction with a "rubber rod" warping technique.

The classifier component 602 is operatively coupled to a regression component 604 that can receive information related to labeled digital ink (e.g., labeled maxima and/or minima in digital handwriting data) and can perform a multi-line regression technique to evaluate relative offsets between a bottom line (e.g., a decender line), a base line, a midline, a top line, and/or any other suitable marker line that can be employed to delineate points within a handwriting sample or input. Relative offsets can be utilized to delineate a new desired position for each maximum and minimum. An interpolation component 606 can receive offset information from the regression component 604 and can interpolate offsets and/or point displacements to a two-dimensional (2D) grid by employing various interpolation techniques and/or constraints.

For example, according to an aspect, the interpolation component 606 can employ "rubber sheet" (described above with regard to FIG. 1) warping constraints. A displacement component 608 can mitigate undesirable inks and/or curvature in digital ink resulting from interpolation, wherein the displacement component 608 receives interpolated handwriting data from the interpolation component 606 and enforces curvature and/or compression constraints between original and interpolated ink. For instance, the displacement component 608 can employ a "rubber rod" technique, described above with regard to FIG. 1, to enforce such constraints.

System 600 can additionally comprise memory 610 that is operatively coupled to one or more of the classifier component 602, the regression component 604, the interpolation component 606 and/or the displacement component 608, and that stores information related to extrema labeling, interpolation and/or displacement algorithms, extrema classification algorithms, and any other suitable information related to providing ink normalization/beautification in a digital handwriting environment. A processor 612 can be operatively connected to one or more components 602, 604, 606, and/or 608 of the system 600 (and/or memory 610) to facilitate analysis of information related to ink normalization, beautification, extrema classification, regression, interpolation, displacement, and the like. It is to be appreciated that the processor 612 can be a processor dedicated to analyzing and/or generating information received by the classification component 602 (and/or other components of the system 600), a processor that controls one or more components of the system 600, and/or a processor that both analyzes and generates information received by the classification component 602 (and/or other components of the system 600) and controls one or more components of the system 600.

Memory 610 can additionally store protocols associated with generating extrema classifications, interpolation and/or displacement techniques (e.g., rubber sheet, rubber rod, . . . ) etc., such that system 600 can employ stored protocols and/or algorithms to achieve ink normalization and beautification to facilitate mitigating variations in digital handwriting to improve text recognition and the like, as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory.

Figure 7:
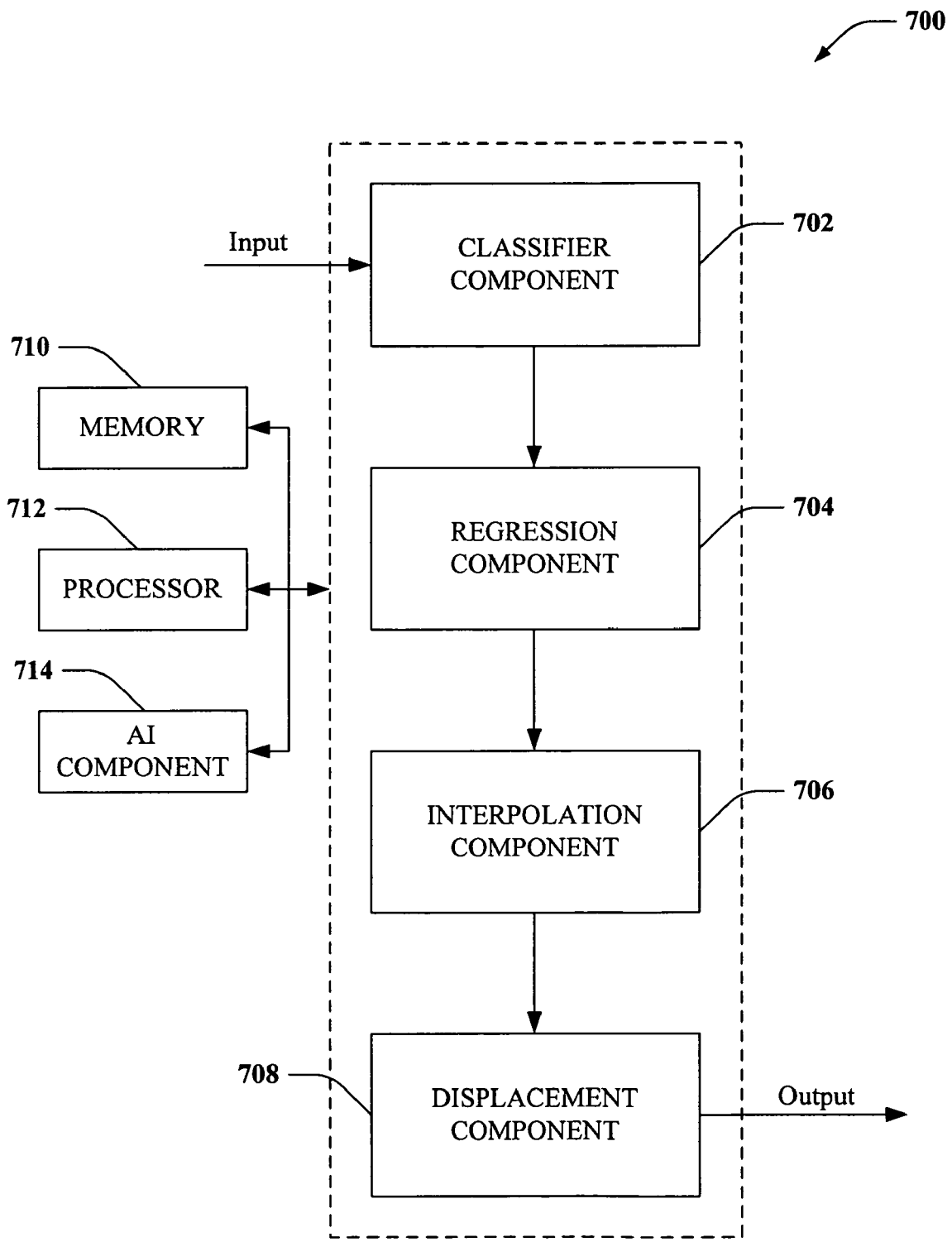
FIG. 7 is an illustration of a system that facilitates classifying extrema in digitally inked handwriting to permit warping of handwritten words to minimize handwriting variability without segmentation.

FIG. 7 is an illustration of a system 700 that facilitates classifying extrema in digitally inked handwriting to permit warping of handwritten words to minimize handwriting variability without segmentation. The system 700 comprises a classifier component 702 that receives input such as digitally inked handwriting and labels extrema therein (e.g., bottom, baseline, midline, top line, other, etc.), and a regression component 704 that receives information from the classifier component 702 and analyzes such information to determine relative offsets in the handwriting via a multi-line regression technique. An interpolation component 706 is operatively associated with the regression component 704 to perform an interpolation technique on the handwriting, such as the rubber sheet technique described with regard to FIG. 1. Upon completion of the rubber sheet technique, a displacement component 708 can employ a rubber rod technique to mitigate undesirable deformations caused by the rubber sheet technique and to enforce rigidity constraints, also as described with regard to FIG. 1.

System 700 can additionally comprises a memory 710 and a processor 712 as detailed above with regard to FIG. 6. Moreover, an AI component 714 can be operatively associated with the classifier component 702, the regression component 704, the interpolation component 706, and/or the displacement component 708, and can make inferences regarding extrema classification and/or labeling, handwriting ambiguity, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, The AI component 714 can infer an appropriate classification for an ink portion that is ambiguous for not falling into a predefined extrema category (e.g., baseline, bottom, midline, top, etc.) and as such is categorized as "other." According to this example, it can be determined that an ink portion, such as an orphan line, dot, requires classification. The AI component 714, in conjunction with processor 712 and/or memory 710, can determine that the ink portion is not an errant mark or accidental stroke. AI component 714 can infer that a the ink portion is in fact an orphaned stroke (e.g., a t-crossing, a dot for an "i," etc.) In such a case, AI component 714 can facilitate restoring the stroke to its parent character in the most efficient manner possible to mitigate ambiguity and improve legibility of the digital handwriting. It will be appreciated that the foregoing example is illustrative in nature and is not intended to limit the scope of inferences that can be made by the AI component 714 or the manner in which the AI component 714 makes such inferences.

In accordance with various aspects (e.g., in connection with extrema classification, handwriting displacement, warping, legibility improvement, etc.) the AI component 714 and/or the classifier component 702 can employ various artificial intelligence based schemes. For example, a process for determining which label to apply to an identified extrema can be facilitated via an automatic classifier system and process. Moreover, where the extrema are ambiguous, the classifier can be employed to determine which extrema label is a best fit.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of digitally generated handwriting, for example, attributes can be endpoints of written characters, time trajectories associated with character generation, or other data-specific attributes derived from the time trajectories, handwriting, etc., and the classes are categories or areas of interest, such as maxima and minima labels that can be applied to the characters.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria which label to assign to a given maxima or minima, which features are to be strictly preserved when warping digital handwriting, etc. The criteria can include, but is not limited to, an initial position of the maxima or minima, a desired position of the maxima or minima, etc.

Figure 8:
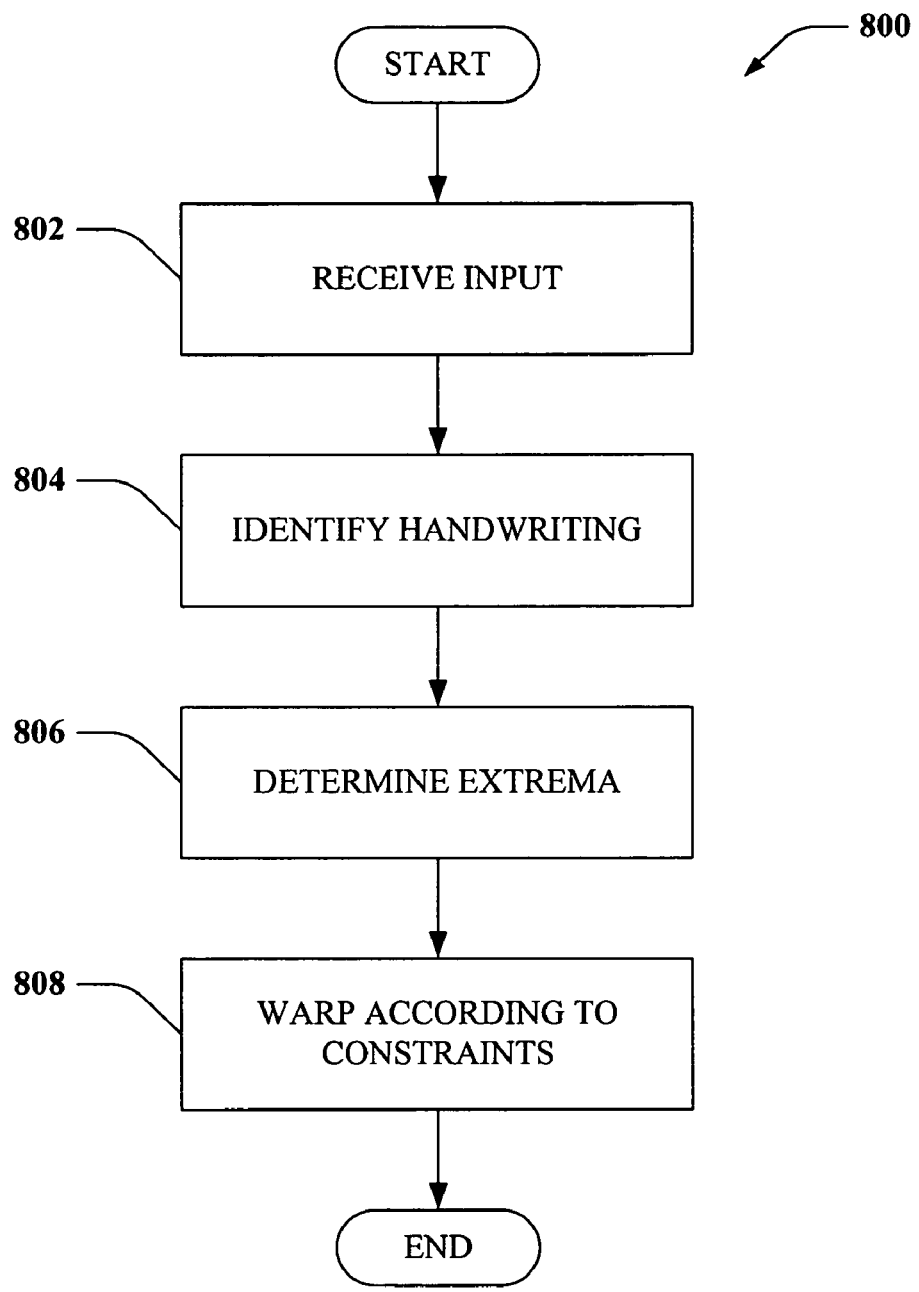
Figure 9:
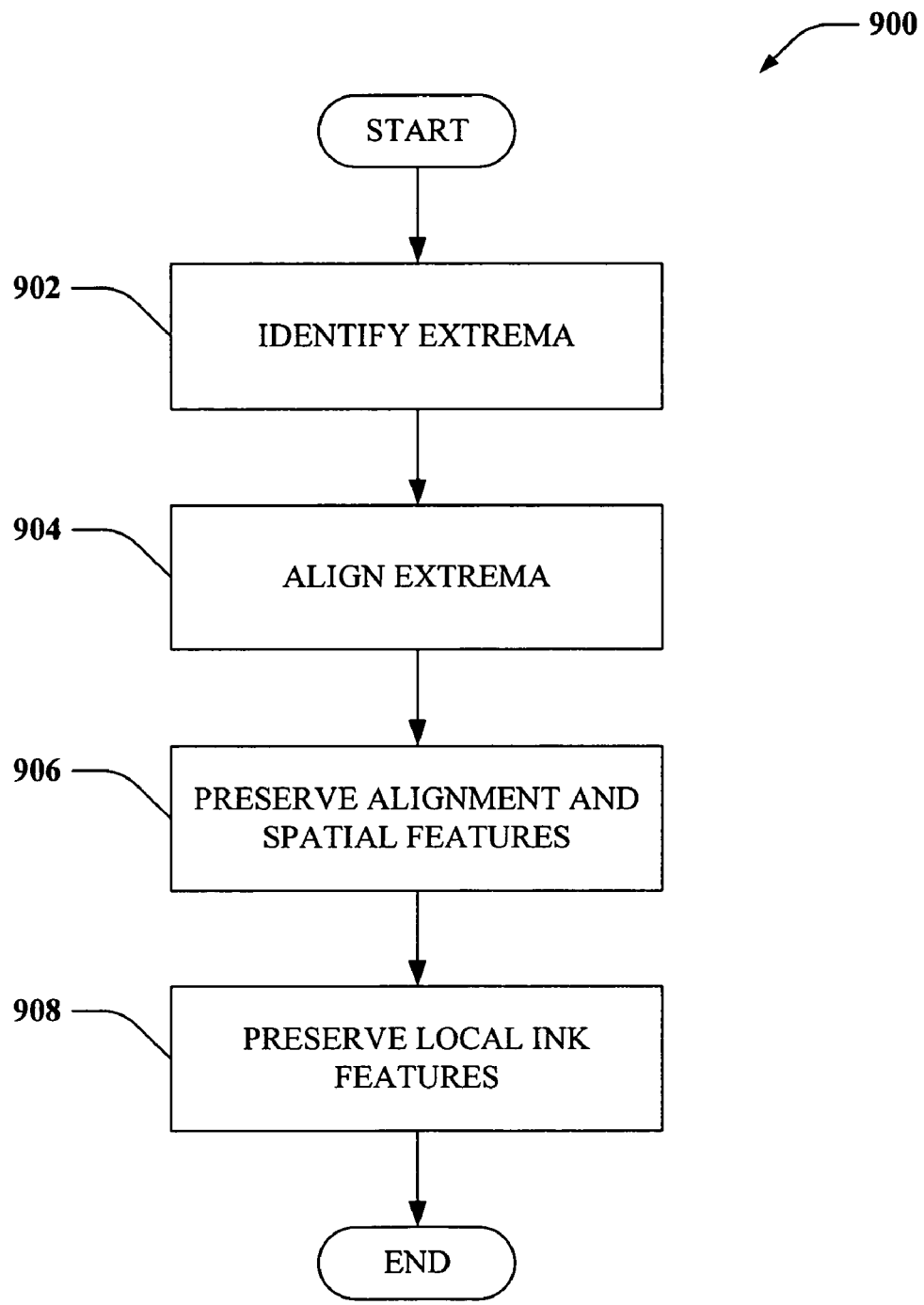
FIG. 9 is an illustration of a methodology for beautifying and normalizing digital handwriting to improve legibility in accordance with various aspects set forth herein.
Figure 10:
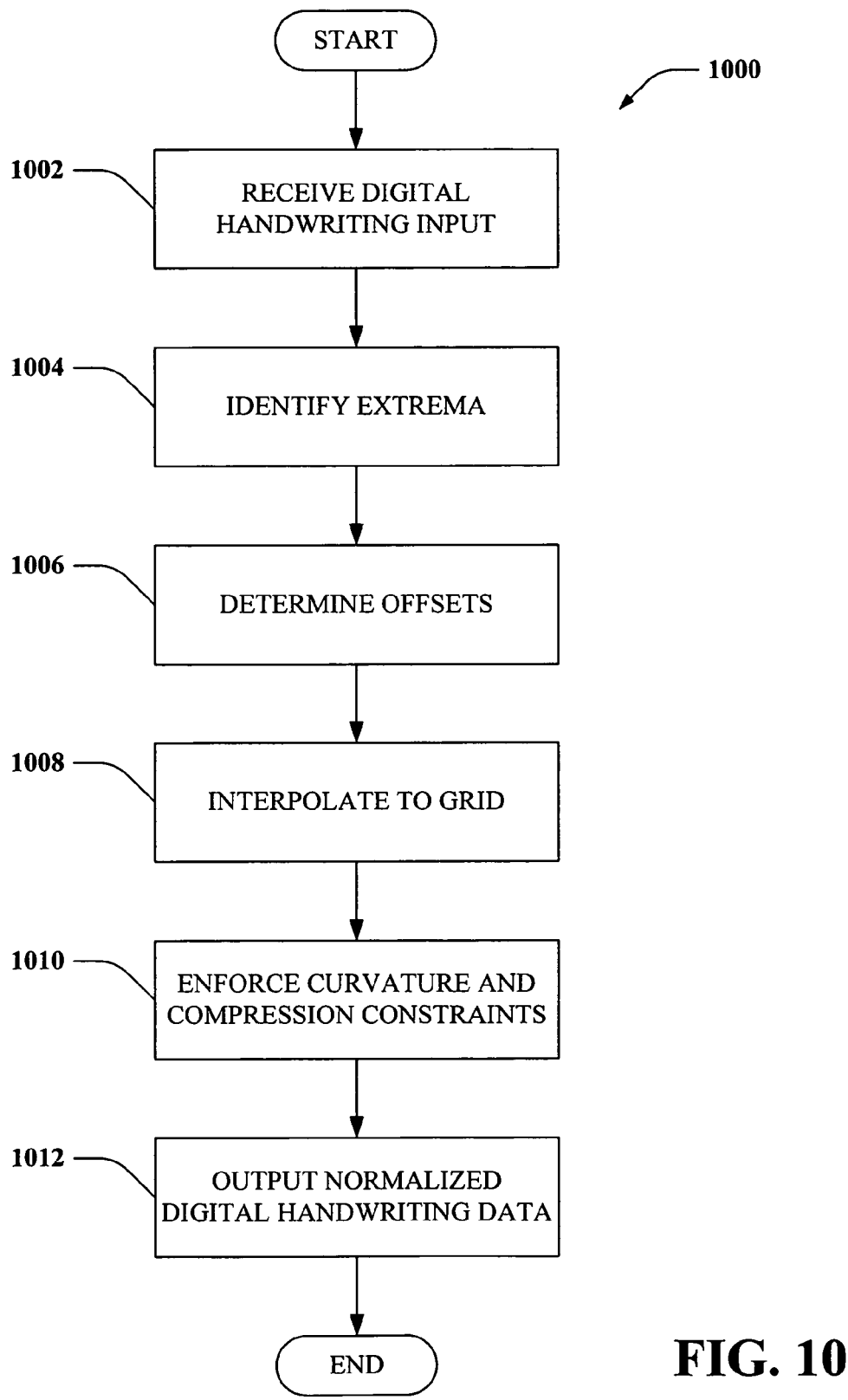
FIG. 10 is an illustration of a methodology for improving digital handwriting legibility by employing a specialized classifier and a combination displacement protocol in accordance with various aspects described herein.

With reference to FIGS. 8-10, there are illustrated flowcharts in accordance with aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 8 is an illustration of a methodology 800 for normalizing and beautifying digitally generated handwriting, such as on a Tablet PC, a scanned handwriting document, and the like. At 802, an input image can be received. The image can be, for example, a document generated on a tablet PC, a scanned image, etc., and can comprise one or more portions of digitized handwriting. At 804, such portions can be identified to facilitate indicating that normalization and/or beautification can be performed according to aspects described herein in order to improve legibility for a human and/or computer-executable character recognition application.

At 806, extrema in the handwriting can be identified and classified. For example, various extrema categories can include a bottom extremum, a baseline extremum, a midline extremum, a top extremum, an "other" extremum that pertains to extrema not fitting into the preceding categories, etc., without being limited thereto. As will be appreciated by one skilled in the art, any number of extrema labels and/or categories can be utilized to facilitate increasing granularity and/or scalability with regard to the methods and systems presented herein. In the case of a handwriting image generated on, for example, a tablet PC, time stamps associated with a tablet pen or stylus can be collected from the tablet PC and utilized to facilitate 1D warping of the handwriting, if desired. In the event that the handwritten image is a scanned document or other image for which time trajectories are not available, the image can be interpolated to a 1D trajectory grid and points on the grid that are linked (e.g., connected by an ink stroke) can be subjected to various rigidity constrains described above with regard to FIG. 1.

At 808, handwriting can be warped according to a plurality of constraints to normalize digital ink therein and improve legibility. For example, a 2D displacement protocol, such as a rubber sheet technique, can be utilized to facilitate enforcing a plurality of curvature and compression constraints, as set forth with regard to FIG. 1 and equations (8)-(12). Rigidity constraints can then be enforced via, for instance, a rubber rod displacement technique, also set forth with regard to FIG. 1, and equations (13) and (15)-(18). In this manner, the handwritten image can be beautified (e.g., made more legible) without introducing undesirable deformations that can occur as a result of enforcing a rubber sheet technique or a rubber rod technique alone.

FIG. 9 is an illustration of a methodology 900 for beautifying and normalizing digital handwriting to improve legibility in accordance with various aspects set forth herein. At 902, extrema in a digital image comprising handwritten text can be evaluated and classified. For instance, labels can be automatically added to handwritten ink extrema to indicate which of a plurality of extrema lines such extrema are intended to be aligned (e.g., top, midline, baseline, bottom, other, . . . ). Such extrema identification can be facilitated using time trajectories associated with the generation of the handwriting on, for instance, a tablet PC. A customized classifier can be generated and/or utilized to output a classification for each extrema in the handwritten image. It will be appreciated that the classifier can be specialized, such as the convolution neural network described with regard to FIGS. 1 and 2, and that labels can comprise the extrema lines described above, and/or letters (e.g., "a," "b," . . . ). Labels and/or classifications can be utilized for several purposes, including but not limited to detection of handwriting versus other types of images (e.g., drawings, printed text, . . . ), normalization of ink with or without warping to facilitate pre-processing for automatic handwriting recognition, construction of an automated handwriting recognition application, legibility improvement for a human viewer, etc.

At 904, extrema points can be aligned with the desired extrema lines to which respective points have been classified (e.g., the upper extrema of lower case letters, such as "e" can be aligned to a midline, . . . ). In order to further improve legibility, at 906, a plurality of constraints can be enforced to preserve alignment, special features (e.g., intersections between ink strokes, distances between portions of ink, . . . ) and the like. Enforcing such constraints at 906 can be achieved by utilizing, for instance, a rubber sheet displacement algorithm, such as is described with regard to FIG. 1 and equations (8)-(12). In order to mitigate undesired kinks and/or effects on curvature, aspect ratio, angles of ink strokes, etc., local ink feature preservation constraints can be introduced and enforced at 908. For example, a 1D rubber rod displacement technique can be employed to maintain constraints between an original ink trajectory and a new ink trajectory, as detailed with regard to FIG. 1 and equations (13) and (15)-(18). In this manner, the 2D rubber sheet displacement technique can be followed by the 1D rubber rod displacement technique to facilitate normalizing and beautifying ink (e.g., legibility improvement) to minimize variation in handwriting and permit easier identification by a human reader and/or a handwriting recognition application.

FIG. 10 is an illustration of a methodology 1000 for improving digital handwriting legibility by employing a specialized classifier and a combination displacement protocol in accordance with various aspects described herein. At 1002, digital handwritten input can be received, such as an image handwritten on a tablet PC, a scanned handwritten document, etc., and portions of the image containing digital handwriting can be identified and distinguished from non-handwritten text, images, and the like. At 1004, extrema can be identified and labeled in a manner similar to that described with regard to FIG. 8 and/or as described with respect to the classifier protocol of FIG. 1.

At 1006, offsets between extrema labels can be determined and/or evaluated using, for example, a multi-linear regression technique, such as set forth with regard to equations (1)-(7) above. The determination of offset information and relationships at 1006 facilitates computation of an optimal displacement that can align each point to its respective line during interpolation/displacement protocol to warp the handwriting and improve legibility. At 1008, the handwritten image can be interpolated to a 2D grid. Such can be performed utilizing a rubber sheet technique, which enforces alignment and special feature preservation constraints.

At 1010, curvature and compression constraints can be enforced to normalize the handwritten ink. For example, the alignment constraints associated with the rubber sheet interpolation can constrain vertical displacement to prevent a letter "d" from being vertically compressed into an letter "a," etc. Similarly, spatial feature preservation constraints can be enforced to preserve intersections and distances between pieces of ink. Such constraints can prevent, for instance, a letter "u" from being pinched at an upper portion thereof to resemble a letter "a," and the like. Additionally, curvature constraints can be enforced to prevent inversion of curves, kinking, and the like. At 1012, the normalized handwritten image can be output to a human viewer and/or to a computer-executable handwriting recognition application with reduced variation and improved legibility.

Figure 11:
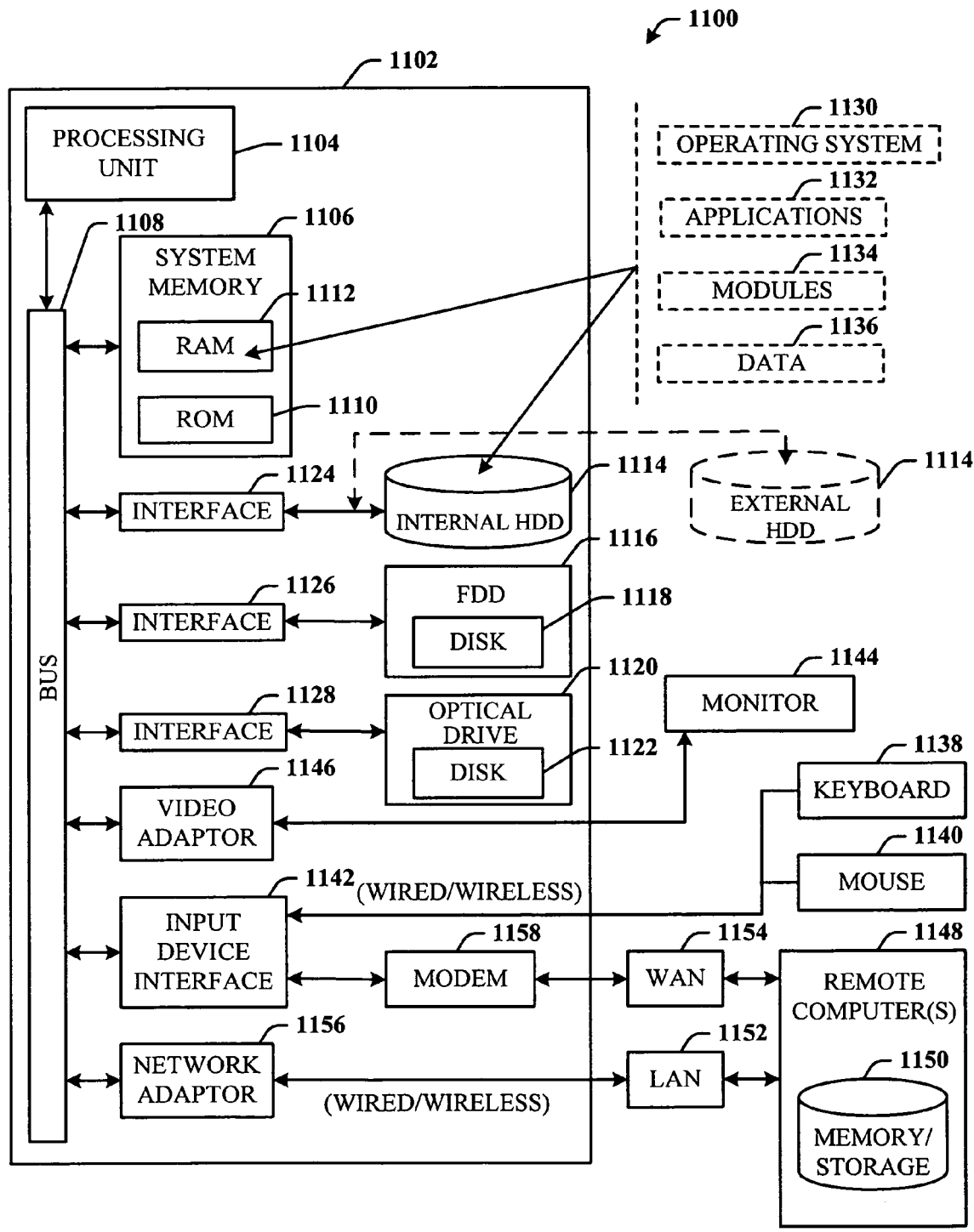
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the subject invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
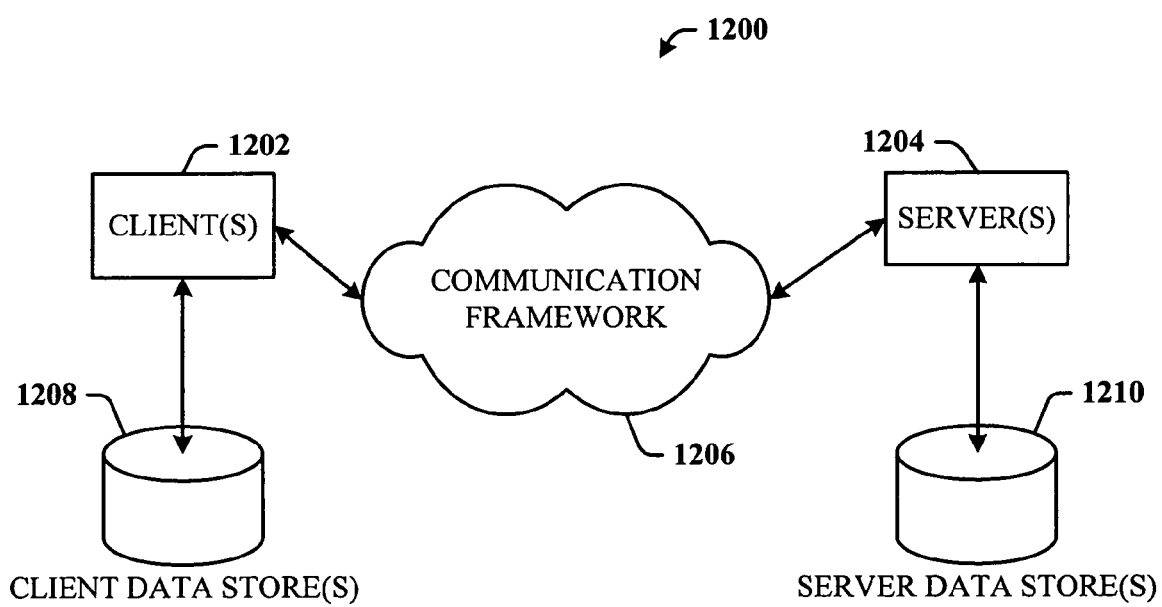
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the subject invention, for example. The system 1200 also includes one or more server(s) 1204. The server(s) 1204 can also be hardware and/or software (e.g., threads, processes, computing devices). The servers 1204 can house threads to perform transformations by employing the subject invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates handwriting recognition and normalization, comprising:
   a processor; and
   a memory component communicatively coupled to the processor, the memory component having stored therein computer-executable instructions configured to implement the system including:
   a classifier component that receives as input data related to a digitally handwritten document, the digitally handwritten document including an original trajectory comprising a plurality of original points, the classifier component labels extrema in the original trajectory;

a regression component that evaluates offsets between extrema in the handwritten words and determines new positions for respective extrema, and performs a non-linear warping technique that aligns extrema points to the new positions indicated by the classifier labels;

an interpolation component that interpolates a new position for each of the original points from the new positions for the extrema so as to create an interpolated trajectory comprising a plurality of interpolated points; and a displacement component that adjusts each of the interpolated points as a function of whether the interpolated point adheres to a local ink preservation constraint, the local ink preservation constraint being a constraint on how much each interpolated point may deviate from a corresponding original point.

2. The system of claim 1, extrema labels comprise at least one of a bottom line, a baseline, a midline, and a top line.

3. The system of claim 2, further comprising an "other" extrema label that is applied to extrema points that do not fit into at least one of the bottom line, baseline, midline, and top line classifications.

4. The system of claim 1, the interpolation component interpolates the original trajectory to a two-dimensional grid and performs a "rubber sheet" displacement technique to warp the handwriting.

5. The system of claim 4, the displacement component performs a "rubber rod" displacement technique on the interpolated trajectory, which enforces rigidity constraints on the interpolated trajectory after application of the rubber sheet displacement technique resulting in a normalized handwriting.

6. The system of claim 5, further comprising a computer-executable handwriting recognition application that receives the normalized handwriting and converts the normalized handwriting to text.

7. The system of claim 1, further comprising an intelligence component that employs a probabilistic and/or statistical-based analysis to prognose or infer an action that a user desires to be automatically performed.

8. The system of claim 1, the regression component implementing a polynomial regression to compute target positions of extrema of a same class.

9. A method of warping digital handwriting to improve legibility, comprising:

employing a processor to execute computer executable instructions stored on a computer readable storage medium to implement the following acts:

classifying minima and maxima in digital ink representations of handwritten words, the handwritten words including an original trajectory comprising a plurality of original points;

determining offsets between original positions of maxima and minima and desired positions associated with maxima and minima classifications;

warping the handwritten words so as to align the original positions of the maxima and minima with the desired positions associated with the maxima and minima classifications;

interpolating a new position for each of the original points from the desired positions associated with the maxima and minima classifications so as to create an interpolated trajectory comprising a plurality of interpolated points; and modifying each of the interpolated points as a function of whether the interpolated point adheres to a local ink preservation constraint, the local ink preservation constraint being a constraint on how much the interpolated trajectory may differ from the original trajectory.

10. The method of claim 9, further comprising interpolating the offsets to a two-dimensional grid and applying a rubber sheet displacement algorithm that preserves alignment of ink strokes, intersections of ink strokes, and distances between ink strokes in the handwritten words.

11. The method of claim 10, further comprising applying a rubber rod displacement algorithm that preserves local ink stroke features.

12. The method of claim 11, the local ink stroke features are at least one of curvature, aspect ratio, and angle, associated with one or more ink strokes in the handwritten words.

13. The method of claim 9, implemented as a pre-processing application for a handwriting recognition program.

14. The method of claim 9, the handwritten words are generated using a tablet PC.

15. The method of claim 14, classifying minima and maxima comprises receiving time trajectory information related generation of individual ink strokes on the tablet PC and analyzing the time trajectory information to determine endpoints of the ink strokes.

16. The method of claim 9, the digital ink representations are generated by scanning a document containing handwritten words.

17. The method of claim 16, interpolating the handwritten words to a one-dimensional grid and imposing a rigidity constraint between points on the grid that are connected by an ink stroke.

18. A computer-readable medium having stored thereon computer-executable instructions for performing the method of claim 9.

19. A system that facilitates mitigating handwriting variation and improving legibility of digitally-generated handwriting, comprising:

means for identifying extrema in the handwriting, the handwriting including an original trajectory comprising a plurality of original points;

means for classifying identified extrema onto a memory unit;

means for warping the classified extrema to desired positions;

means for interpolating a new position for each of the original points from the desired positions so as to create an interpolated trajectory comprising a plurality of interpolated points; and means for retaining curvatures, aspect ratios, and angles associated with individual ink strokes in the handwriting, wherein each of the interpolated points are transformed as a function of whether the interpolated point adheres to a local ink preservation constraint, the local ink preservation constraint being a constraint on how much the interpolated trajectory may differ from the original trajectory.

20. The system of claim 19, the means for interpolating comprises means for performing a rubber sheet optimization technique on the handwriting to increase legibility while preserving global spatial features and alignment of handwritten characters, and the means for retaining comprises means for performing a rubber rod optimization technique on the handwriting to increase legibility while preserving local spatial features of the handwritten characters.

* * * * *